Figure 1:
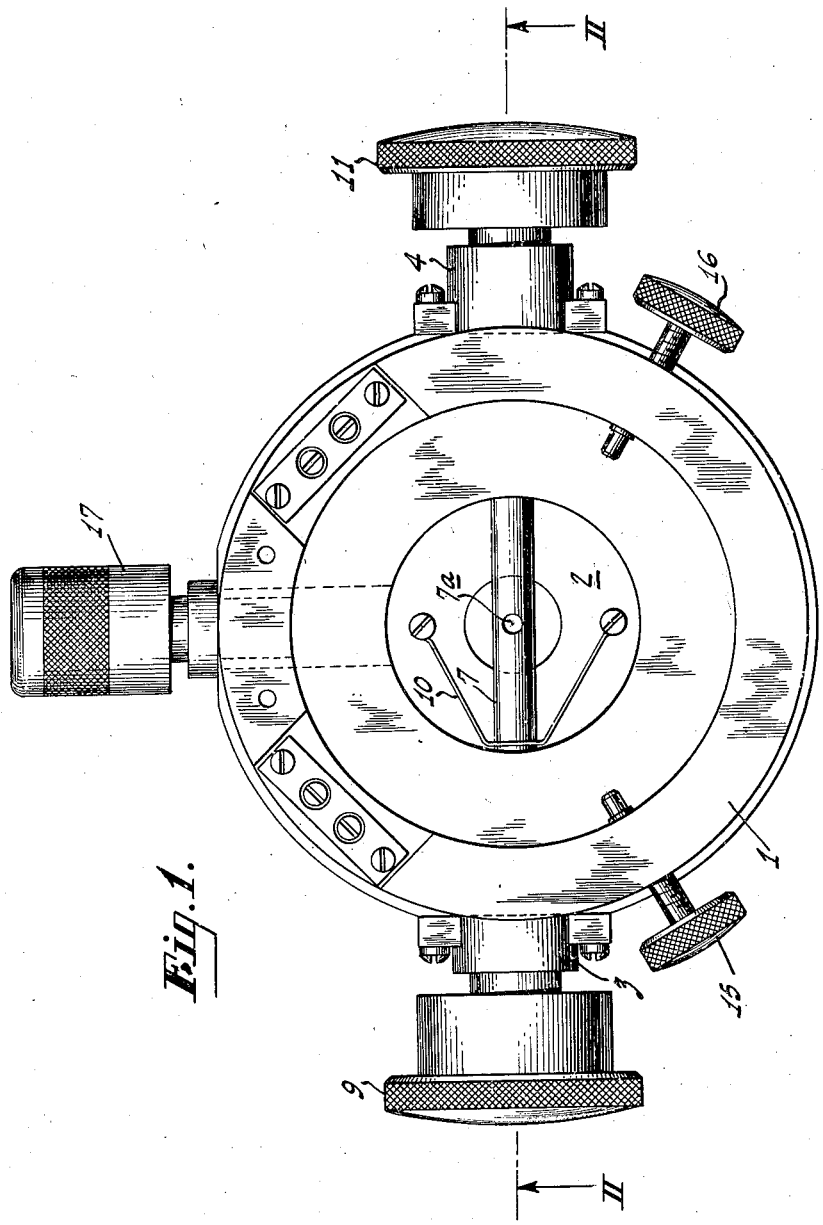

March 15, 1949.  E. G. DORNFELD  2,464,382
SPECIMEN HOLDER FOR ELECTRON
OPTICAL INSTRUMENTS
Filed Dec. 30, 1947  2 Sheets-Sheet 1

Inventor
EDMUND G. DORNFELD
By
Attorney

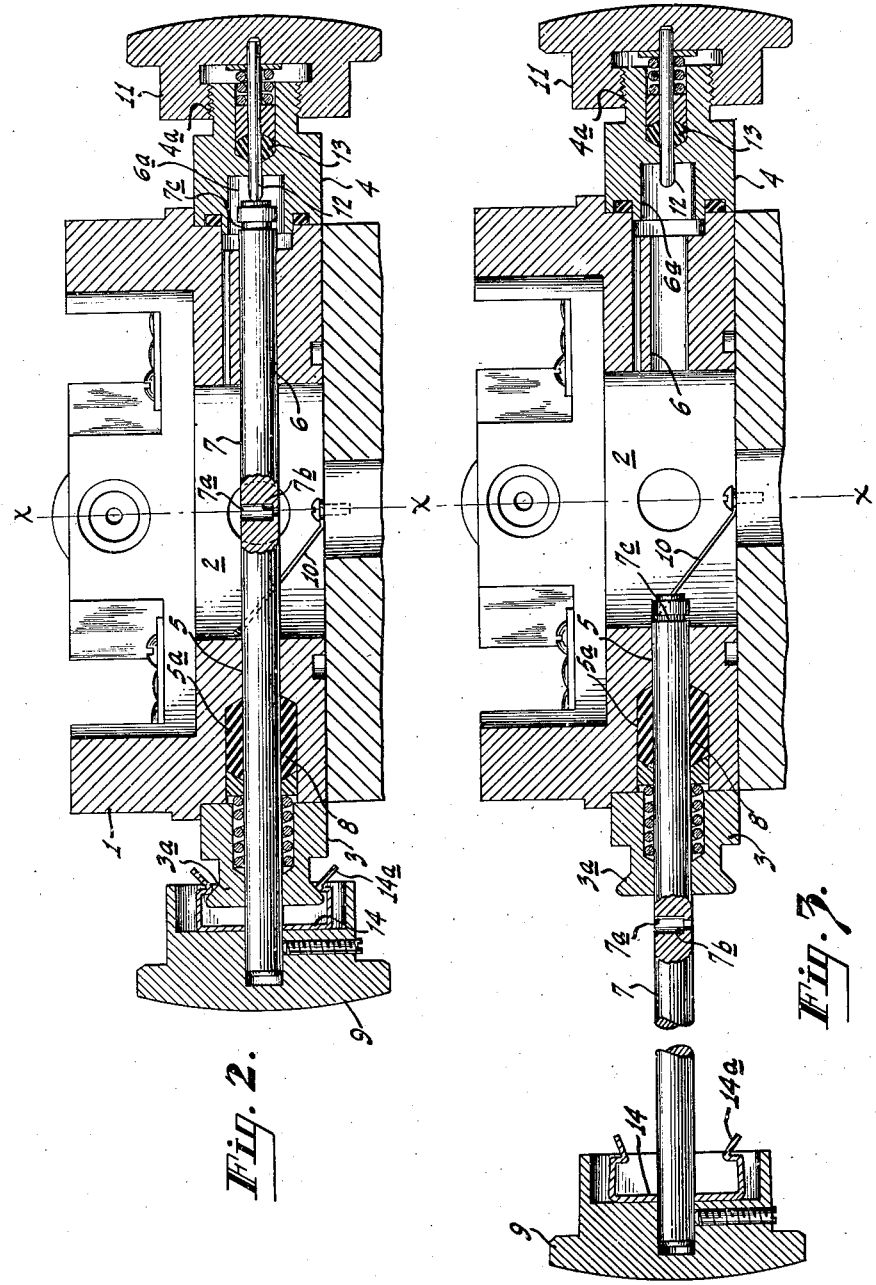

Patented Mar. 15, 1949

2,464,382

UNITED STATES PATENT OFFICE 2,464,382

SPECIMEN HOLDER FOR ELECTRON OPTICAL INSTRUMENTS

Edmund G. Dornfeld, Barrington, N. J., assignor to Radio Corporation of America, a corporation of Delaware Application December 30, 1947, Serial No. 794,593

4 Claims. (Cl. 250—49.5)

This invention relates to electron-optical instruments and has for its principal object to provide improved means for introducing a specimen or specimens into the evacuated interior of such instruments and for aligning the specimen with respect to the electron beam within the instrument.

It has previously been proposed (see U. S. Patent, Krause 2,264,210) to provide a specimen-holder in the form of a rod containing a number of specimen-holding apertures, the rod extending into the evacuable interior of the microscope and supported in the walls thereof in a vacuum-tight manner for rotation and longitudinal movement about and along a line which intercepts the electron-optical axis of the microscope. One very real advantage of such specimen holders resides in the fact that the rod may be pulled out a sufficient distance to permit the specimen or specimens to be changed without seriously impairing the vacuum within the instrument. However, such holders have not enjoyed the wide acceptance which they apparently merit, possibly because (a) of the difficulties incident to realigning the specimen-holding apertures with respect to the electron-optical axis or beam of the instrument upon changing specimens and (b) the rod cannot be removed from the path of the beam, hence it is not easy to determine whether or not the beam is in fact turned-on while the instrument is being "set-up."

The foregoing objections to the rod-like specimen-holders of the prior art is overcome, in accordance with the present invention, by making the rod in two discrete parts which may be entirely withdrawn from the path of the beam and one of which comprises an adjustable "stop" for the other. Thus, when the beam is properly centered and when a specimen has been correctly aligned with respect to the beam, and then examined, the specimen-holding part may be withdrawn, re-filled, and subsequently re-aligned simply by moving it inwardly until its movement is halted by the said pre-set "stop." The invention may be said further to reside in the details of construction described in the following specification and in the accompanying drawings, wherein:

Fig. 1 is a top plan view, and Fig. 2 is a sectional view taken on the line II—II of Fig. 1, of the specimen chamber of an electron microscope showing a specimen-holder and an adjusting mechanism therefor constructed in accordance with the principle of the present invention; the specimen holder being shown aligned with the electron optical axis of the microscope, and Fig. 3 is a view similar to Fig. 2 but with the holder partway withdrawn from the microscope to permit changing the specimen.

In the illustrated embodiment of the invention 1 designates, generally, a hollow metal body or casting which will be understood to form part of the evacuable casing of an electron-optical instrument such, for example, as a diffraction camera or an electron-microscope, and $x$—$x$ (see Figs. 2 and 3) designates the optical axis of the instrument along which electrons travel in the form of an undeviating beam from an "upper" electron-gun or other source (not shown) to a "lower" fluorescent screen, photographic plate or other target (not shown). The hollow interior of this metal casing is designated 2 and is hereinafter referred to as the "specimen-chamber" of the instrument. Two oppositely located collars 3 and 4 on the exterior of the casing 1 are provided with radially aligned bores 5 and 6 which extend into the chamber 2. A rod-like member 7 is entered into the said chamber through a vacuum tight seal 8 in an enlarged section 5a of the bore 5. The seal 8 here shown is of the type described in U. S. Patent 2,418,903, issued April 15, 1947 to Frank E. Runge, though it may be of any convenient type designed to allow both rotational and axial movement of the rod 7 along and about an axis which intercepts the electron axis $x$—$x$ of the instrument.

The rod 7 is provided adjacent to its center with one or more transverse holes 7a within which the specimen or object to be examined is mounted, as on a horizontally disposed fine-mesh screen (not shown) which is adapted to be seated upon an inner shoulder 7b. The end of the rod 7 which extends to the exterior of the specimen chamber 2 is provided on its outer end with a knob 9 to which the axial and rotational movements required to align the specimen holding aperture 7a with respect to the electron axis $x$—$x$ may be applied.

The outward movement of the specimen-holding rod 7 is limited by a tilted V-shape spring 10 (see Fig. 1) which is biased to bear against the surface of the rod and to drop into a circular groove 7c adjacent to the inner end thereof when the said end has been withdrawn to a point beyond the path $x$—$x$ of the beam, as shown in Fig. 3. The spring 10 thus prevents the accidental total removal of the rod and the consequent breaking of the vacuum in the chamber 2. Since the rod 7 is so dimensioned and arranged that it may be moved out of the path of the beam the operator can observe the orientation, intensity and spot-size of the beam directly, i. e. without causing the electrons to pass through the restricted aperture 7a.

The collar 4 on the side of the instrument opposite to the collar 3 and knob 9 is provided with an end-portion 4a of reduced circumference having an external thread upon which a complementary internally threaded knob 11 is received. This knob 11 and its threaded support 4a comprise a control for a relatively thin shaft 12 which is affixed on the interior of the knob and extends through a vacuum tight seal 13 into an enlarged portion 6a of the bore 6 in register with the central axis of the specimen-holder rod 7. The shaft 12 thus comprises a longitudinally movable "stop" for the rod 7. The rotational movement of the knob 11 and shaft 12 required to move the said shaft or "stop" inwardly is prevented from affecting the angular setting of the specimen-holding rod 7 by the drag exerted upon the outer end of the said rod 7 by a cup-shape spring 14 contained in the knob 9. It will be observed upon inspection of Fig. 2 that this spring 14 is provided with an outwardly turned rim 14a which engages the conical shaped end 3a of the collar 3, when the rod is pushed in, but may be disengaged, as shown in Fig. 3, by pulling the rod out to the position whereat further outward movement is prevented by the V-shape spring 10.

It will be observed upon inspection of Fig. 1 that the top of the specimen chamber 2 is provided with three screws 15, 16 and 17 disposed about 120° apart on the casting 1. These screws are designed to bear against the outer surface of an upper chamber (not shown) of the instrument and to adjust the position thereof and hence the alignment of the electron-gun and/or electron-lens within the said chamber with respect to the specimen chamber, for example in the manner described in copending application Ser. No. 783,496 to Burger et al., filed November 1, 1947. In "setting-up" the improved instrument of the present invention the preferred practice is to pull the specimen holder rod 7 out to the position shown in Fig. 3 and to turn-on the beam which, being unobstructed, can be observed upon the fluorescent screen of the instrument. If the beam is not correctly centered its position may be adjusted by means of the screws 15, 16 and 17. When the beam has been adjusted the knob 9 may be pushed in and the rod 7 moved to a position whereat the specimen-holding aperture 7a is slightly to the right of the optical axis $x—x$ and then, moved back into register with the beam by turning the threaded knob 11 which controls the longitudinal movement of the adjustable stop 12. If the rod 7 must be rotated about its axis in order to present the speciment at a desired angle with respect to the beam the knob 9 may be rotated with one hand while the other controls the movement of the adjustable stop. As previously indicated, the frictional coupling 14 on the end of the rod 7 prevents the rotary movement required to adjust the position of the stop 12 from changing the angular setting of the aperture 7a with respect to the axis $x—x$ of the beam. This latter feature is of especial importance in taking stereo pictures since the longitudinal setting of the specimen holder must not be disturbed in making angular adjustment required to achieve such pictures.

What is claimed is:

1. In an electron-optical instrument comprising an evacuable chamber having an axis along which electrons travel in the form of a beam from a source to a target, a rod-like member having a specimen-holding aperture therein supported in a bore in the wall of said chamber on opposite sides of said axis for rotation and for longitudinal movement about and along a line which intersects the axis of said electron beam, the length of said rod and the relative position of said specimen-holding aperture therein being so related that when said rod is moved outwardly to a position whereat said specimen holding aperture is exterior of said chamber the inner portion of said rod is out of the path of said beam within said chamber.

2. In an electron-optical instrument comprising an evacuable chamber having an axis along which electrons travel in the form of a beam from a source to a target, a rod-like member having a specimen-holding aperture therein supported in a bore in the wall of said chamber on opposite sides of said axis for rotation and for longitudinal movement about and along a line which intersects the axis of said electron beam, and a longitudinally adjustable stop for said rod in said bore.

3. The invention as set forth in claim 2 and wherein means are provided for exerting a frictional force upon said specimen-holding rod, and wherein said longitudinally adjustable stop is mounted for rotation in said bore and bears against the center of the inner end of said rod, whereby rotary movement of said adjustable stop is prevented by said frictional force from being transmitted to said rod.

4. In an electron-optical instrument comprising an evacuable chamber having an optical axis and having a bore extending through the walls of said chamber along a line substantially normal to said axis, a specimen holder in the form of an apertured rod mounted within said bore on one side of said axis and extending to the exterior of said instrument, a control member on the outer end of said rod, an adjustable stop comprising a screw within said bore in contact with said rod and extending to the exterior of said chamber on the other side of said axis, and a frictional coupling between said control member and a wall of said chamber for frictionally maintaining a desired angular setting of said rod with respect to said optical axis when said screw is subjected to rotational movement in contact with said rod.

EDMUND G. DORNFELD.

No references cited.